(12) United States Patent
Chen et al.

(10) Patent No.: US 8,275,521 B2
(45) Date of Patent: Sep. 25, 2012

(54) SYSTEM AND METHOD FOR CONTROLLING AIR GAP BETWEEN A TRACTOR AND A TRAILER

(75) Inventors: Cheng Chen, Fort Wayne, IN (US); Fong-Ioon Pan, Fort Wayne, IN (US); Gary Wagner, Roanoke, IN (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 714 days.

(21) Appl. No.: 12/505,034

(22) Filed: Jul. 17, 2009

(65) Prior Publication Data

US 2011/0015830 A1     Jan. 20, 2011

(51) Int. Cl.
    *B60R 22/00*     (2006.01)
(52) U.S. Cl. ........ 701/49; 280/438.1; 280/407; 280/441
(58) Field of Classification Search .................... 701/49; 280/434, 438.1, 407, 441
    See application file for complete search history.

(56) References Cited

U.S. PATENT DOCUMENTS

| | | | | |
|---|---|---|---|---|
| 3,701,547 A * | 10/1972 | Goold | ........................... | 280/432 |
| 3,717,273 A | 2/1973 | Berends | | |
| 3,734,537 A * | 5/1973 | Holmberg et al. | ........... | 280/421 |
| 3,869,147 A * | 3/1975 | Fry | ........................... | 280/438.1 |
| 3,880,440 A * | 4/1975 | Tidewell | ..................... | 280/81.6 |
| 3,941,408 A * | 3/1976 | Petersson | .................... | 280/421 |
| 4,405,146 A * | 9/1983 | Mitchell | ....................... | 280/432 |
| 4,475,740 A * | 10/1984 | Strick | ........................... | 280/403 |
| 4,557,497 A * | 12/1985 | Rumminger | ................... | 280/403 |
| 4,934,727 A * | 6/1990 | Hawkins et al. | .............. | 280/432 |
| 5,346,239 A * | 9/1994 | Wohlhuter | ..................... | 280/420 |
| 5,388,849 A | 2/1995 | Arsenault | | |
| 5,393,084 A * | 2/1995 | Kleysen | ....................... | 280/442 |
| 5,626,356 A | 5/1997 | Harwood | | |
| 6,170,849 B1 | 1/2001 | McCall | | |
| 6,223,114 B1 * | 4/2001 | Boros et al. | ..................... | 701/70 |
| 6,786,795 B1 * | 9/2004 | Mullaney et al. | ............ | 446/431 |

(Continued)

FOREIGN PATENT DOCUMENTS

CA     CN 101691126 B *  2/2012

(Continued)

OTHER PUBLICATIONS

Evasion of instabilities caused by neglected subsystems and saturations in the control of a cart of asynchronous electric drives Tar, J.K.; Rati, C.; Rudas, I.J.; Bito, J.F.; Machado, J.; Intelligent Systems and Informatics, 2009. SISY '09. 7th International Symposium on;Digital Object Id.: 10.1109/SISY.2009.5291124; Pub. Yr: 2009, pp. 389-394.*

(Continued)

*Primary Examiner* — Cuong H Nguyen
(74) *Attorney, Agent, or Firm* — Jeffrey P. Calfa; Mark C. Bach

(57) ABSTRACT

A highway tractor (12) has a fifth wheel (28) to which a trailer (14) that is to be towed by the tractor can be coupled. A positioning system sets fore-aft position of the fifth wheel on the tractor. The positioning system (FIG. 2; FIG. 3) has a positioning mechanism for moving the fifth wheel fore and aft on the tractor and a controller for processing certain data that is used to cause the positioning mechanism to move the fifth wheel to a fore-aft target position on the tractor.

22 Claims, 2 Drawing Sheets

U.S. PATENT DOCUMENTS

| | | | |
|---|---|---|---|
| 7,451,993 B2 * | 11/2008 | Zanini | 280/124.111 |
| 7,862,067 B2 * | 1/2011 | Alguera | 280/438.1 |
| 2008/0036173 A1 * | 2/2008 | Alguera | 280/407 |
| 2008/0067781 A1 * | 3/2008 | Shirk | 280/433 |
| 2009/0184490 A1 * | 7/2009 | Alguera | 280/420 |
| 2011/0257849 A1 * | 10/2011 | Alberius et al. | 701/49 |

FOREIGN PATENT DOCUMENTS

| | | | |
|---|---|---|---|
| EP | 1812278 A1 * | 8/2007 | |
| WO | WO 2006029732 A1 * | 3/2006 | |

OTHER PUBLICATIONS

Nonlinear straight path tracking control for an articulated steering type vehicle; Shiroma, N.; Ishikawa, S.; ICCAS-SICE, 2009 Publication Year: 2009 , pp. 2206-2211.*

Simulation of an articulated tractor-implement-trailer model under the influence of lateral disturbances; Siew, K.W.; Katupitiya, J.; Eaton, R.; Pota, H.; Advanced Intelligent Mechatronics, 2009. AIM 2009. IEEE/ASME International Conference on Digital Object Identifier: 10.1109/AIM.2009.5229888; Publication Year: 2009 , pp. 951-956.*

* cited by examiner

SYSTEM AND METHOD FOR CONTROLLING AIR GAP BETWEEN A TRACTOR AND A TRAILER

TECHNICAL FIELD

This disclosure relates to self-propelled wheeled towing vehicles, such as highway tractors, that tow other wheeled vehicles, such as trailers, through a coupling that typically comprises a fifth wheel on the tractor to which a kingpin on the trailer is coupled.

BACKGROUND OF THE DISCLOSURE

A tractor-trailer combination that transports cargo on roads and highways inherently has significant aerodynamic resistance due to its large shape and size. The air gap that exists between a tractor and a trailer is known to have an effect on a tractor-trailer's aerodynamic drag. Various structures or features can be added to or incorporated in the design of tractors and trailers to aid in reducing drag. Some structures and features have an association with the air gap between the tractor and the trailer that is intended to reduce turbulence at the air gap that contributes to drag.

The fifth wheel of a tractor typically has an adjustment mechanism that allows the fore-aft position of the fifth wheel to be set for a particular trailer that is to be towed. Once set, the fifth wheel is typically locked in place by some sort of mechanical locking device.

SUMMARY OF THE DISCLOSURE

This disclosure generally relates to embodiments of a system and a method for controlling an air gap between a tractor and a trailer.

In one embodiment, a vehicle combination comprises a first vehicle that is propelled along a road surface by and in unison with a second vehicle via an articulated coupling that couples a front portion of the first vehicle and a rear portion of the second vehicle to provide for articulation of the first vehicle relative to the second vehicle while a portion of weight of the first vehicle is borne by the rear portion of the second vehicle. A system is included for setting position of the articulated coupling relative to at least one of the first vehicle and the second vehicle. The system comprises a positioning mechanism for moving the articulated coupling fore and aft relative to at least one of the first vehicle and the second vehicle. A controller is provided for processing certain data to yield target data representing a target position for the articulated coupling relative to at least one of the first vehicle and the second vehicle and for processing the target data and data representing actual position of the articulated coupling relative to at least one of the first vehicle and the second vehicle to yield control data that is used to operate the positioning mechanism for moving the articulated coupling to the target position.

Another embodiment provides a method for setting a fore-aft dimension of an air gap between a rear wall of a towing vehicle and a front wall of a towed vehicle being towed by the towing vehicle. In this method, certain data is processed to yield target data representing a target position relative to at least one of the towed vehicle and the towing vehicle for an articulated coupling that couples a front portion of the towed vehicle to a rear portion of the towing vehicle to provide for relative articulation of the towing vehicle and the towed vehicle while a portion of weight of the towed vehicle is borne on the rear portion of the towing vehicle. The target data and data representing actual position of the articulated coupling relative to at least one of the towed vehicle and the towing vehicle is processed to yield control data for operating a positioning mechanism that can move the articulated coupling fore and aft on at least one of the towed vehicle and the towing vehicle. The control data is used to operate the positioning mechanism to move the articulated coupling to a target position.

A further embodiment provides a combination of a tractor and a trailer comprising a fifth wheel disposed on the tractor to which the trailer can be coupled for towing by the tractor. A system is provided comprising a positioning mechanism for positioning the fifth wheel on the tractor within a range of positions. A controller is included for processing certain data to yield target data representing a target position within the range of positions and for processing the target data and data representing actual position of the fifth wheel to yield control data that is used to operate the positioning mechanism for moving the fifth wheel to the target position.

DETAILED DESCRIPTION

Figure 1:
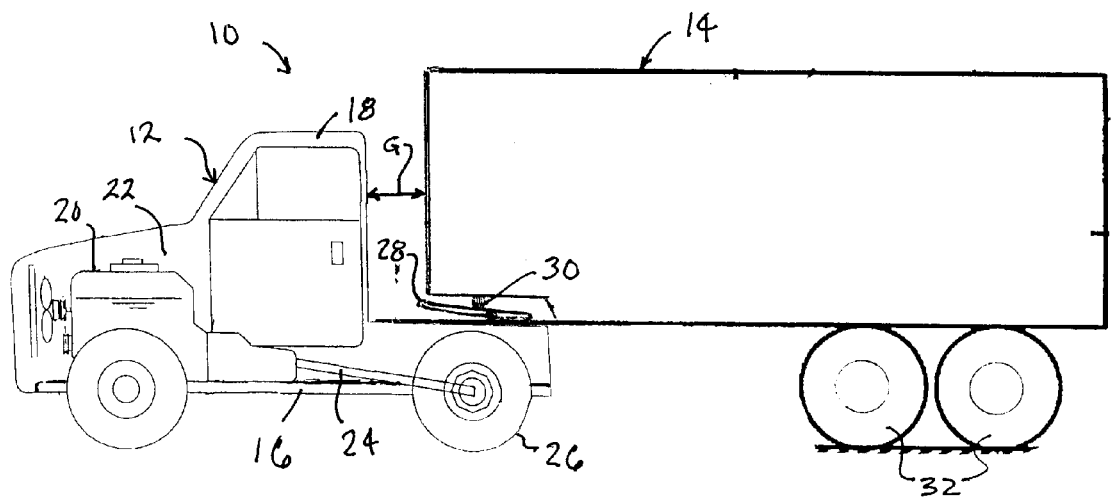
FIG. 1 shows a tractor-trailer in left side elevation view.

FIG. 1 shows a tractor-trailer rig 10 comprising a highway tractor 12 and a walled trailer 14 whose body comprises a cargo carrying floor, an upright front wall, upright side walls, a roof, and access doors at the rear. Tractor 12 comprises a chassis 16 on which a cab 18 is centrally mounted. An engine 20 that is housed within an engine compartment 22 is mounted on chassis 16 forwardly of cab 18. A drivetrain 24 couples engine 20 with driven rear wheels 26 of a rear axle that is suspended from chassis 16.

Mounted on chassis 16 over the rear axle is a fifth wheel 28 to which a kingpin 30 on trailer 14 is coupled. The rear of trailer 14 is supported on the underlying road surface via a bogie containing sets of tandem road wheels 32 on each side. The connection of trailer 14 to tractor 12 provides for articulation of the trailer on the tractor about the generally vertical axis of kingpin 30 while transmitting fore-aft forces between the tractor and the trailer so that when the tractor accelerates it pulls the trailer with it and when it decelerates, so does the trailer.

Figure 2:
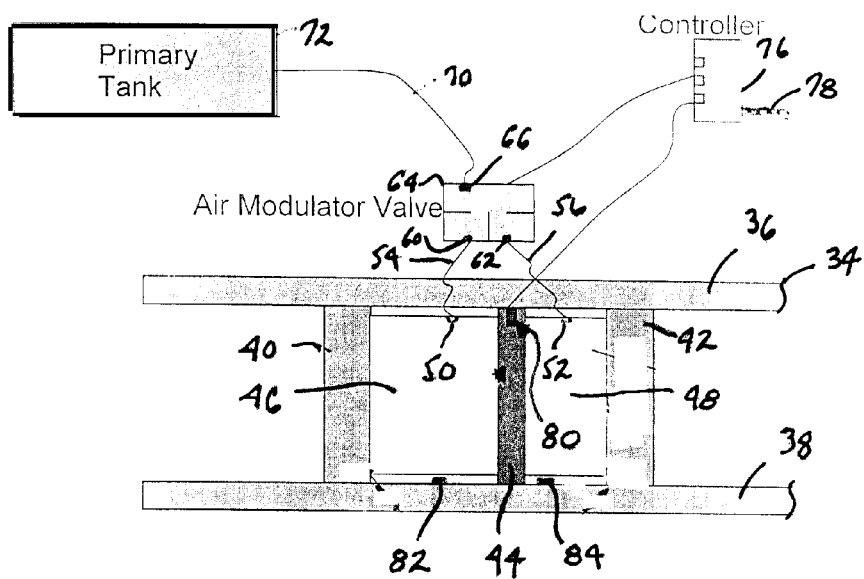
FIG. 2 is a schematic diagram showing detail of a first embodiment of the disclosed system.

FIG. 2 shows chassis 16 to comprise a frame 34 having side rails 36, 38 that are bridged by cross members 40, 42 that are spaced apart lengthwise of the frame. A base 44 that supports fifth wheel 28 is disposed in the space between cross members 40, 42 and is supported on side rails 36, 38 for translation lengthwise of the frame to provide similar translation for fifth wheel 28. Translation of base 44 toward the front of tractor 12 moves fifth wheel 28 forward while rearward translation of base 44 moves fifth wheel 28 rearward.

The fuel economy of a tractor-trailer rig is related to the aerodynamic properties of both the tractor and the trailer. The greater the aerodynamic drag force on the rig, the greater the quantity of fuel that the vehicle consumes.

The following mathematical relationship defines a correlation of aerodynamic drag to certain parameters associated with the rig and its operation.

$$F\_aero = \frac{1}{2}\rho \cdot V_x^2 \cdot Cd \cdot A$$

where,

F_aero=Aerodynamic drag force
ρ=air density
Vx=vehicle longitudinal speed
Cd=aerodynamic drag coefficient
A=truck frontal area The above relationship shows that reducing the aerodynamic drag coefficient Cd can lower the aerodynamic drag force F_aero acting on the rig when moving and hence improve fuel economy. Both wind tunnel and on-road testing have shown that the size of the air gap between an upright rear wall of the tractor cab and the upright front wall of the trailer body affects the aerodynamic drag coefficient.

In general, reducing the length of the air gap, i.e. reducing the distance between the tractor cab rear wall and the trailer body front wall as measured along the length of the rig (reference G in FIG. 1), can, at higher vehicle speeds, mitigate to some extent the influence of increased speed on aerodynamic drag. Yet, reducing the air gap can be counterproductive to maneuverability of the rig, particularly at lower speeds such as when turning a corner or backing into a loading/unloading dock.

The ability to adjust the fore-aft position of the fifth wheel on the tractor enables the air gap to be reduced at higher road speeds, such as when the rig is traveling on a highway, and to be increased at lower speeds for maneuverability when the rig is making tight turns, either forward or in reverse, that cause significant articulation between the tractor and the trailer.

A variable volume walled chamber 46 is disposed in the space between base 44 and cross member 40, and a variable volume walled chamber 48 is disposed in the space between base 44 and cross member 42. Each walled chamber 46, 48 can expand and contract in length in the direction of the frame's length.

Each chamber comprises a respective port 50, 52 in its wall through which the chamber's interior is communicated via a respective pneumatic conduit 54, 56 to a respective port 60, 62 of an electrically-operated modulator valve 64. Valve 64 comprises a further port 66 that communicates through a pneumatic conduit 70 with a compressed air source or tank 72. Tank 72 is kept charged with air at some super-atmospheric pressure by an on-board compressor (not shown), both compressor and tank typically being already present in many highway tractors to supply various systems such as air brakes.

A controller 76 is electrically connected with valve 64 to control the valve's operation. Controller 76 may be an existing controller in the electrical system of tractor 12 or a devoted controller. Controller 76 comprises a processor containing a control algorithm for modulating air pressure in the respective chambers 46, 48 via valve 64.

One of several inputs to controller 76 comprises a vehicle data link 78 in a CAN network in the tractor's electrical system that may use a protocol like that defined by SAE (Society of Automotive Engineers) Standard J1939 for example, on which controller 76 can read various data of interest. Another of the several inputs comprises a sensor 80 that provides data representing the lengthwise position of base 44 on frame 34, and hence the fore-aft position of fifth wheel 28 on the frame.

Controller 76, valve 64, and the two walled chambers 46, 48 collectively form a pneumatic control system for setting the gap G between tractor 12 and trailer 14 based on the speed at which the tractor is pulling or pushing the trailer.

The control algorithm that is executed by controller 76 processes certain data to determine a fore-aft target location for fifth wheel 28. The data includes the road speed of tractor 12 which is available on data link 78. Position data for fifth wheel 28 is furnished by sensor 80. By processing speed and sensor data according to the control algorithm, controller 76 causes valve 64 to modulate the delivery and venting of compressed air to and from the respective chambers 46, 48 to force base 44 to a position that places fifth wheel 28 in the fore-aft target position.

The end walls of walled chambers 46, 48 that are closest to each other are disposed against base 44. The opposite end wall of chamber 46 is disposed against cross member 40 while the opposite end wall of chamber 48 is disposed against cross member 42.

Base 44 is moved to a target position by operating valve 64 to a position that introduces pressurized air into one chamber while venting the other, causing the one chamber to push base 44 along frame 34 as the volume of the one chamber expands to increase its length and base 44 to compress the other chamber that is being vented.

When the fore-aft target position has been reached, controller 76 operates valve 64 to create sufficiently large pressures in the respective chambers that provide sufficient forces on base 44 to hold it, and hence fifth wheel 28, in the target position.

Fore-aft travel limits are imposed on base 44 by hardware stoppers 82, 84 on frame 34 that define the travel limits for base 44 so that fifth wheel 28 cannot travel beyond the travel range allowed by the stoppers.

Depending on the road speed of the rig, controller 76 may move base 44 to a new target position for changing the length of the air gap G. Appropriate target positions at certain higher speeds can be obtained by wind tunnel or road testing that determines a proper gap at each of different speed set points, for example at 40, 50, 60, and 70 miles per hour. At higher road speeds, the air gap should, in general, decrease as road speed increases. Appropriate fore-aft target positions for certain lower speed set points, at 0, 10, 20, and 30 miles per hour for example, are typically determined by maneuvering considerations.

Time as well as road speed may be a factor in re-positioning fifth wheel 28. For example, after the rig has accelerated and remained within a certain speed range for some pre-defined time, such as one minute, controller 76 may operate valve 64 to introduce more air into chamber 48 while correspondingly venting chamber 46 to push base 44 forward to the appropriate target, thereby reducing the air gap to one appropriate for the current speed range. When the rig decelerates to some lower speed, controller 76 may operate valve 64 to introduce more air into chamber 46 while correspondingly venting chamber 48 to push base 44 rearward to the new fore-aft target, thereby increasing the air gap to one appropriate for the new lower speed.

In case of a fault in the control system, a mechanical locking device (not shown in FIG. 2) can lock base 44 to frame 34. Such a locking device 90 is however shown in the embodiment of FIG. 3 which will be described later and which differs in certain respects from the embodiment of FIG. 2.

Figure 3:
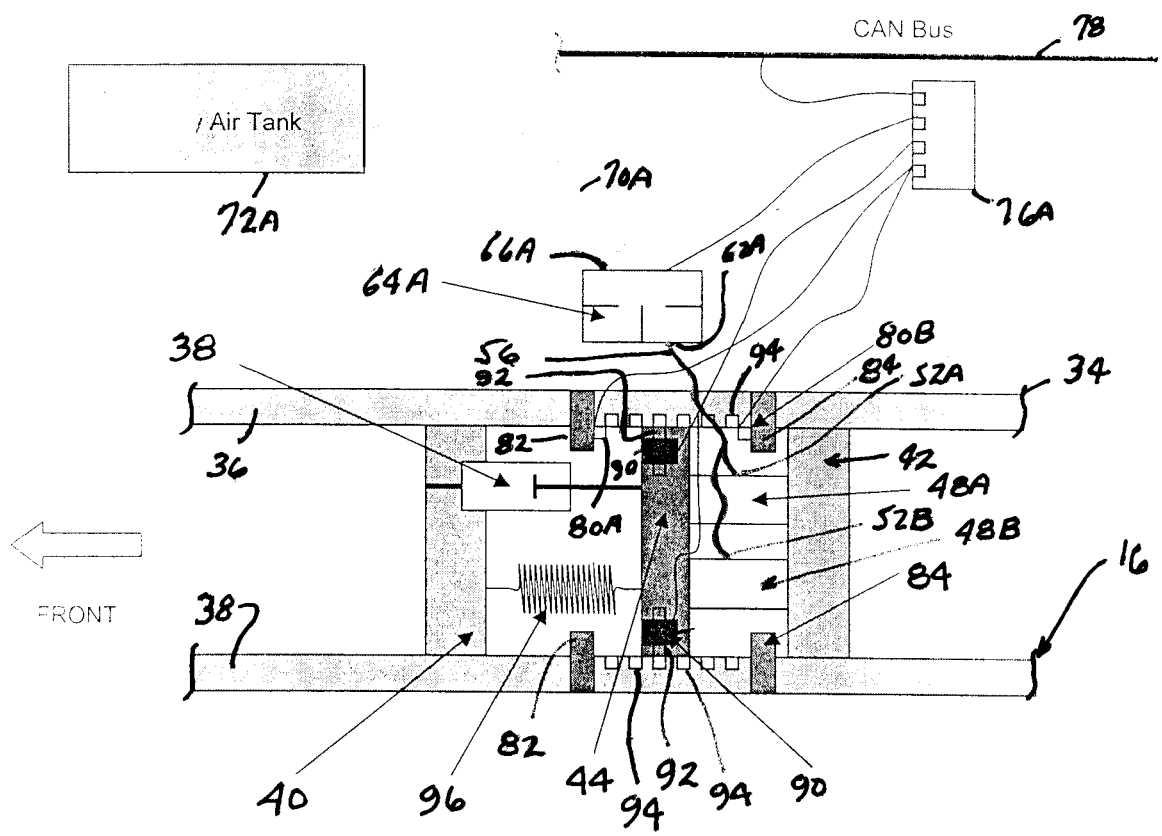
FIG. 3 is a schematic diagram showing detail of a second embodiment of the disclosed system.

Like FIG. 2, FIG. 3 shows chassis 16 to comprise a frame 34 having side rails 36, 38 that are bridged by cross members 40, 42 that are spaced apart lengthwise of the frame. A base 44 that supports fifth wheel 28 is disposed in the space between cross members 40, 42 and is supported on side rails 36, 38 for fore-aft translation lengthwise of the frame to provide similar translation for fifth wheel 28.

Chamber 48 is replaced by two smaller variable volume walled chambers 48A, 48B that are arranged laterally spaced apart in the space between base 44 and cross member 42. Each walled chamber 48A, 48B can expand and contract in length in the direction of the frame's length.

Each chamber 48A, 48B comprises a respective port 52A, 52B in its wall through which the chamber's interior is communicated via a pneumatic conduit 56A to a port 62A of an electrically-operated control valve 64A. Valve 64A comprises a further port 66A that communicates through a pneumatic conduit 70A with a compressed air tank 72A that is kept charged in the same way as tank 72.

A controller 76A is electrically connected with valve 64A to control the valve's operation. Like controller 76, controller 76A may be an existing controller in the electrical system of tractor 12 or a devoted controller. Controller 76A comprises a processor containing a control algorithm for controlling valve 64A to place base 44 in a position commanded by the algorithm.

Several inputs to controller 76A include a vehicle data link 78 in a CAN network in the tractor's electrical system that uses a protocol like that defined by SAE Standard J1939 for example, on which controller 76A can read various data of interest. Other inputs are provided by sensors 80A, 80B at fore-aft travel limits of base 44.

Locking device 90 comprises solenoid-operated lock bolts 92 on base 44 and a series of receptacles 94 running along the lengths of rails 36, 38. When base 44 is positioned to place each bolt in registration with a receptacle and the solenoids are operated, bolts 92 extend outward to lodge in the receptacles thereby locking fifth wheel 28 against fore-aft movement on frame 34. When the solenoids are not operated, bolts 92 retract clear of the receptacles allowing base 44 to move. Stoppers 82, 84 set fore-aft travel limits for base 44. Sensor 80A signals controller 76A when base 44 is at the fore travel limit, and sensor 80B signals controller 76A when base 44 is at the aft travel limit.

A spring-damper mechanism that comprises a compression spring 96 in parallel with a damper 98 operatively relates base 44 to cross member 40.

The control algorithm that is executed by controller 76A processes data to calculate a fore-aft position for fifth wheel 28. Controller 76A operates valve 64A to cause air to be introduced into chambers 48A, 48B when base 44 is to move in the fore direction and to vent air from the chambers when the base is to move in the aft direction. When chambers 48A, 48B are being expanded in length to move base 44 in the fore direction, spring 96 is being increasingly compressed. When chambers 48A, 48B are being vented, the energy stored in spring 96 is effective to move base 44 in the aft direction. Damper 98 serves to damp oscillations that might occur.

When fifth wheel 28 is at either the fore limit of travel or the aft limit of travel, the signal provided by the respective sensor 80A, 80B to controller 76A results in the controller operating locking device 90 to lock base 44 to frame 34 for keeping fifth wheel 28 in that position. When processing of the algorithm by controller 76A discloses that the fifth wheel should be moved, locking device 90 is first operated to unlock base 44 from frame 34 to allow the movement.

Controller 76A can access CAN network data via data link 78, vehicle speed, braking status, and mass estimation being examples of available data. Yaw rate and steering wheel angle data may also be available if tractor 12 has electronic stability control.

When tractor 12 accelerates to speeds greater than some threshold value while fifth wheel 28 is at the aft travel limit, and the tractor maintains those speeds for some pre-defined length of time such as one minute for example, controller 76A, after unlocking base 44 from frame 34, signals control valve 64A to open and begin increasing pressure in chambers 48A, 48B. The increasing pressure expands the chambers, pushing base 44 in the fore direction until its motion is stopped by abutment with stoppers 82. The abutment is signaled to controller 76A by sensor 80A, and the controller responds by operating locking device 90 to lock the base to the frame.

The gap between the tractor and trailer, and hence the aerodynamic load, has now been reduced. This minimum gap should be maintained when lane changes at high speeds are anticipated. Had controller 76A detected, via data link 78, that the foundation brakes been applied while base 44 was in motion toward stoppers 82, controller 76A would have immediately operated locking device 90 seeking to minimize the impact force of the base with the stoppers.

Should tractor 12 decelerate to speeds less than some threshold value while fifth wheel 28 is at the fore travel limit, and the tractor maintains those speeds for some pre-defined length of time, controller 76A, after unlocking base 44 from frame 34, signals control valve 64A to begin venting air from chambers 48A, 48B. Spring 96 can now push base 44 against aft stoppers 84. When sensor 80B signals controller 76A that base 44 is abutting stoppers 84, the controller locks the base to the frame. In this condition, the increased gap between the tractor and trailer allows a greater range of articulation between them for low speed maneuvering.

In the event of a pneumatic system failure, such as leakage from tank 72A or chambers 48A, 48B, or control valve failure, that cause base 44 to be forced against aft stoppers 84, controller 76A will lock the base to the frame when the base abuts the aft stoppers.

Status and OBD information, such as current fifth wheel position, solenoid locking device failure, air system failure, etc., is published on the CAN network and can be displayed to the driver on an instrument panel cluster in the tractor cab.

Although not shown in the Figures, an optional system that comprises a mechanical linkage can be employed in association with any of the pneumatic chambers in either embodiment if a specified range of fore-aft adjustment for the fifth wheel is more than such a chamber or chambers can provide. Such a mechanical linkage would amplify a given amount of pneumatic chamber expansion to meet the specified range, such as a range of twelve to thirty-six inches. The use of such a mechanism may allow improved packaging and/or save on system cost.

Another option for the positioning mechanism also not shown in the Figures comprises making spring 96 an extension spring (instead of a compression spring) that pulls base 44 in opposition to the force applied to the base by chambers 48A, 48B.

What is claimed is:
1. A vehicle combination comprising:
a first vehicle that is propelled along a road surface by and in unison with a second vehicle via an articulated coupling that couples a front portion of the first vehicle and a rear portion of the second vehicle to provide for articulation of the first vehicle relative to the second vehicle while a portion of weight of the first vehicle is borne by the rear portion of the second vehicle; and a system for setting position of the articulated coupling relative to at least one of the first vehicle and the second vehicle, the system comprising a positioning mechanism for moving the articulated coupling fore and aft relative to at least one of the first vehicle and the second vehicle, and a controller for processing certain data to yield target data representing a target position for the articulated coupling relative to at least one of the first vehicle and the second vehicle and for processing the target data and data representing actual position of the articulated coupling relative to at least one of the first vehicle and the second vehicle to yield control data that is used to operate the positioning mechanism for moving the articulated coupling to the target position.

2. The vehicle combination as set forth in claim 1 in which the second vehicle comprises a tractor containing a fifth wheel forming a portion of the articulated coupling and the first vehicle comprises a trailer containing a kingpin forming another portion of the articulated coupling.

3. The vehicle combination as set forth in claim 2 in which the tractor contains the system for setting the position of the articulated coupling relative to at least one of the first vehicle and the second vehicle by setting position of the fifth wheel relative to the tractor.

4. The vehicle combination as set forth in claim 3 in which the positioning mechanism comprises a pneumatic mechanism that uses compressed air from a compressed air source on at least one of the first vehicle and the second vehicle for moving the fifth wheel.

5. The vehicle combination as set forth in claim 4 in which the controller operates the pneumatic mechanism via control of a valve through which compressed air from the compressed air source is delivered to the pneumatic mechanism.

6. The vehicle combination as set forth in claim 5 in which the pneumatic mechanism comprises walled chambers, at least one of the walled chambers acts in a fore direction to move the fifth wheel in the fore direction and at least one of the walled chambers acts in an aft direction to move the fifth wheel in the aft direction.

7. The vehicle combination as set forth in claim 6 in which the at least one of the walled chambers that acts in the fore direction is disposed between a first cross member of a chassis frame of the tractor and a positionable base on which the fifth wheel is mounted, and the at least one of the walled chambers that acts in the aft direction is disposed between a second cross member of the chassis frame and the positionable base.

8. The vehicle combination as set forth in claim 3 in which the certain data processed by the controller to yield the target data includes road speed data at which the vehicle combination is traveling, and the controller utilizes the road speed data to cause the positioning mechanism to re-position the fifth wheel for certain road speed changes to change a fore-aft dimension of an air gap between the tractor and the trailer for such road speed changes.

9. The vehicle combination as set forth in claim 8 in which the controller causes the positioning mechanism to successively re-position the fifth wheel at successively higher road speeds to successively reduce the fore-aft dimension of the air gap between the tractor and the trailer.

10. A method for setting a fore-aft dimension of an air gap between a rear wall of a towing vehicle and a front wall of a towed vehicle being towed by the towing vehicle, the method comprising the steps of:

processing certain data to yield target data representing a target position relative to at least one of the towed vehicle and the towing vehicle for an articulated coupling that couples a front portion of the towed vehicle to a rear portion of the towing vehicle to provide for relative articulation of the towing vehicle and the towed vehicle while a portion of weight of the towed vehicle is borne on the rear portion of the towing vehicle;

processing the target data and data representing actual position of the articulated coupling relative to at least one of the towed vehicle and the towing vehicle to yield control data for operating a positioning mechanism that can move the articulated coupling fore and aft on at least one of the towed vehicle and the towing vehicle; and using the control data to operate the positioning mechanism to move the articulated coupling to a target position.

11. The method as set forth in claim 10 further comprising the step of:

performing the processing in a controller on the towing vehicle to control the position of a fifth wheel disposed on the towing vehicle and forming a portion of the articulated coupling.

12. The method as set forth in claim 11 further comprising the step of:

causing the positioning mechanism to move the fifth wheel to the target position by delivering compressed air from a compressed air source on the towing vehicle to the positioning mechanism.

13. The method as set forth in claim 12 further comprising the step of:

causing delivery of compressed air to the positioning mechanism to be controlled by a valve whose operation is controlled by the controller.

14. The method as set forth in claim 11 further comprising the step of:

operating the controller to process data that includes road speed data at which the towing vehicle is traveling to yield target data for re-positioning the fifth wheel for certain road speed changes to change the fore-aft dimension of the air gap when such road speed changes occur.

15. The method as set forth in claim 14 further comprising the step of:

causing the fifth wheel to be successively re-positioned at successively higher road speeds.

16. A combination of a tractor and a trailer, the combination comprising:

a fifth wheel disposed on the tractor to which the trailer can be coupled for towing by the tractor;

a system comprising a positioning mechanism for positioning the fifth wheel on the tractor within a range of positions; and a controller for processing certain data to yield target data representing a target position within the range of positions and for processing the target data and data representing actual position of the fifth wheel to yield control data that is used to operate the positioning mechanism for moving the fifth wheel to the target position.

17. The combination as set forth in claim 16 in which the positioning mechanism comprises walled chambers, each of the walled chambers being expansible and contractible, and at least one of the walled chambers acting in a fore direction to move the fifth wheel in the fore direction and at least one of the walled chambers acting in an aft direction to move the fifth wheel in the aft direction.

18. The combination as set forth in claim 17 in which the at least one of the walled chambers that acts in the fore direction is disposed between a first cross member of a chassis frame of the tractor and a positionable base on which the fifth wheel is mounted, and the at least one of the walled chambers that acts in the aft direction is disposed between a second cross member of the chassis frame and the positionable base.

19. The combination as set forth in claim 16 in which the certain data processed by the controller to yield target data includes road speed data at which the tractor is traveling, and the controller utilizes the road speed data at which the tractor is traveling to cause the positioning mechanism to re-position the fifth wheel when certain road speed changes occur.

20. The combination as set forth in claim 19 in which the controller causes the positioning mechanism to successively re-position the fifth wheel in the fore direction at successively higher road speeds.

21. The combination as set forth in claim 16 in which the positioning mechanism comprises at least one expansible and contractible walled chamber for moving the fifth wheel in a first direction along the range of positions and a spring for acting in a second direction that opposes motion of the fifth wheel in the first direction.

22. The combination as set forth in claim 16 in which the positioning mechanism comprises a damper associated with the spring for damping oscillations in the positioning mechanism.

* * * * *